United States Patent
Zhu et al.

(10) Patent No.: US 9,953,677 B1
(45) Date of Patent: Apr. 24, 2018

(54) DEVICE FOR MULTIPLE DISC LOAD AND UNLOAD WITH A PLURALITY OF TELESCOPIC SECTIONS

(71) Applicant: Futurewei Technologies, Inc., Plano, TX (US)

(72) Inventors: Jiafeng Zhu, San Ramon, CA (US); Xiaogang Zhu, San Jose, CA (US); Masood Mortazavi, San Jose, CA (US)

(73) Assignee: Futurewei Technologies, Inc., Plano, TX (US)

( * ) Notice: Subject to any disclaimer, the term of this patent is extended or adjusted under 35 U.S.C. 154(b) by 0 days.

(21) Appl. No.: 15/400,683

(22) Filed: Jan. 6, 2017

(51) Int. Cl.
| | | |
|---|---|---|
| *G11B 17/038* | (2006.01) | |
| *G11B 17/22* | (2006.01) | |
| *G11B 17/04* | (2006.01) | |
| *B25J 18/02* | (2006.01) | |
| *B25J 15/12* | (2006.01) | |
| *G11B 17/16* | (2006.01) | |
| *B25J 15/00* | (2006.01) | |
| *B25J 15/08* | (2006.01) | |
| *B25J 15/10* | (2006.01) | |
| *G11B 17/14* | (2006.01) | |

(52) U.S. Cl.
CPC ......... *G11B 17/225* (2013.01); *B25J 15/0052* (2013.01); *B25J 15/086* (2013.01); *B25J 15/103* (2013.01); *B25J 15/106* (2013.01); *B25J 15/12* (2013.01); *B25J 18/025* (2013.01); *G11B 17/038* (2013.01); *G11B 17/0401* (2013.01); *G11B 17/14* (2013.01); *G11B 17/16* (2013.01)

(58) Field of Classification Search
CPC .. B25J 18/025; B25J 15/0052; B25J 15/0057; B25J 15/0061; B25J 15/106; B25J 15/10; B25J 15/103; B25J 15/12; B25J 15/086; G11B 17/038; G11B 17/14; G11B 17/16
See application file for complete search history.

(56) References Cited

U.S. PATENT DOCUMENTS

| | | | | |
|---|---|---|---|---|
| 3,260,529 A | * | 7/1966 | Brown | G11B 17/14 369/199 |
| 3,416,805 A | * | 12/1968 | Morrison | G11B 17/16 369/209 |
| 4,354,603 A | * | 10/1982 | Dunn | G11B 17/16 211/1.51 |
| 4,644,515 A | * | 2/1987 | Allebest | G11B 17/038 360/98.01 |
| 6,807,673 B2 | * | 10/2004 | Takeshima | G11B 17/225 720/706 |
| 9,245,784 B2 | * | 1/2016 | Hashimoto | B25J 15/0052 |
| 9,799,367 B1 | * | 10/2017 | Zhu | B25J 15/0052 |

* cited by examiner

*Primary Examiner* — Gerald McClain
(74) *Attorney, Agent, or Firm* — Vierra Magen Marcus LLP

(57) ABSTRACT

The present disclosure relates to a storage and transfer apparatus for mass transfer of a plurality of data discs to trays of a plurality stacked disc drives. The storage and transfer apparatus may store a plurality of discs with the disc hold pins retracted and the telescopic sections collapsed over each other. In such a configuration, the stored discs may lie in contact with each other. The storage and transfer apparatus may transfer the plurality of discs to the trays of the plurality of stacked disc drives with the discs holding pins extended and the telescopic sections extended relative to each other.

17 Claims, 19 Drawing Sheets

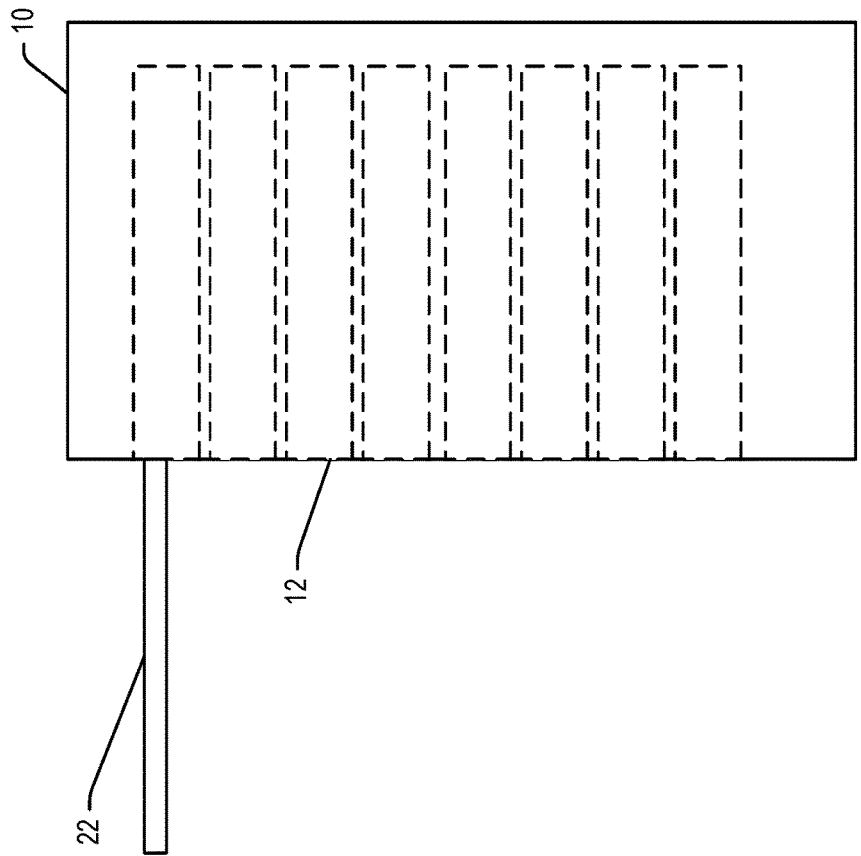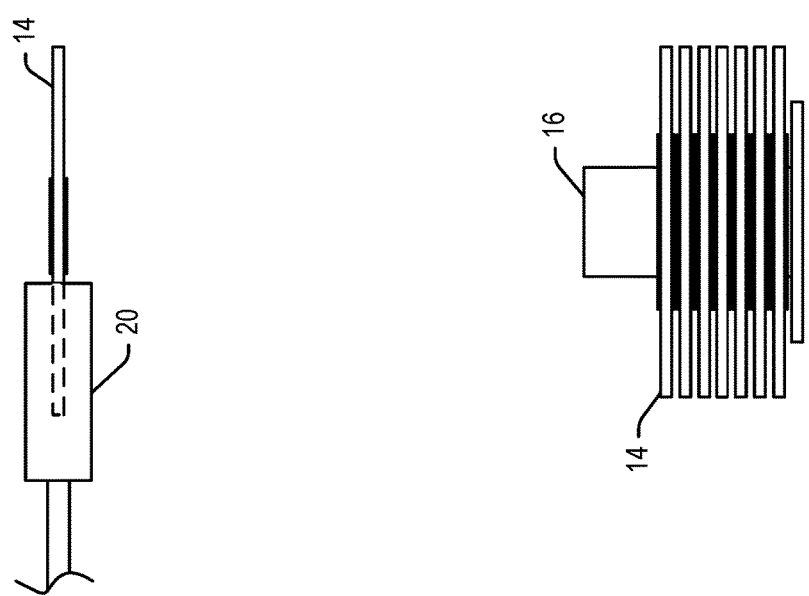
Fig. 2
(Prior Art)

Fig. 3
Fig. 4
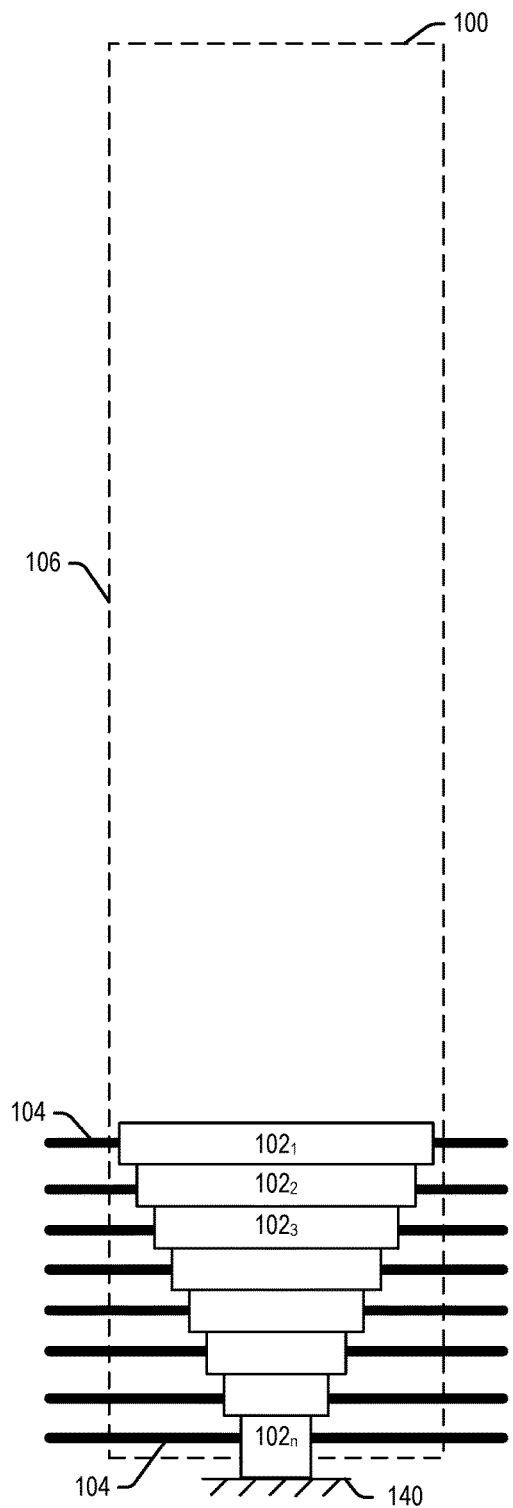
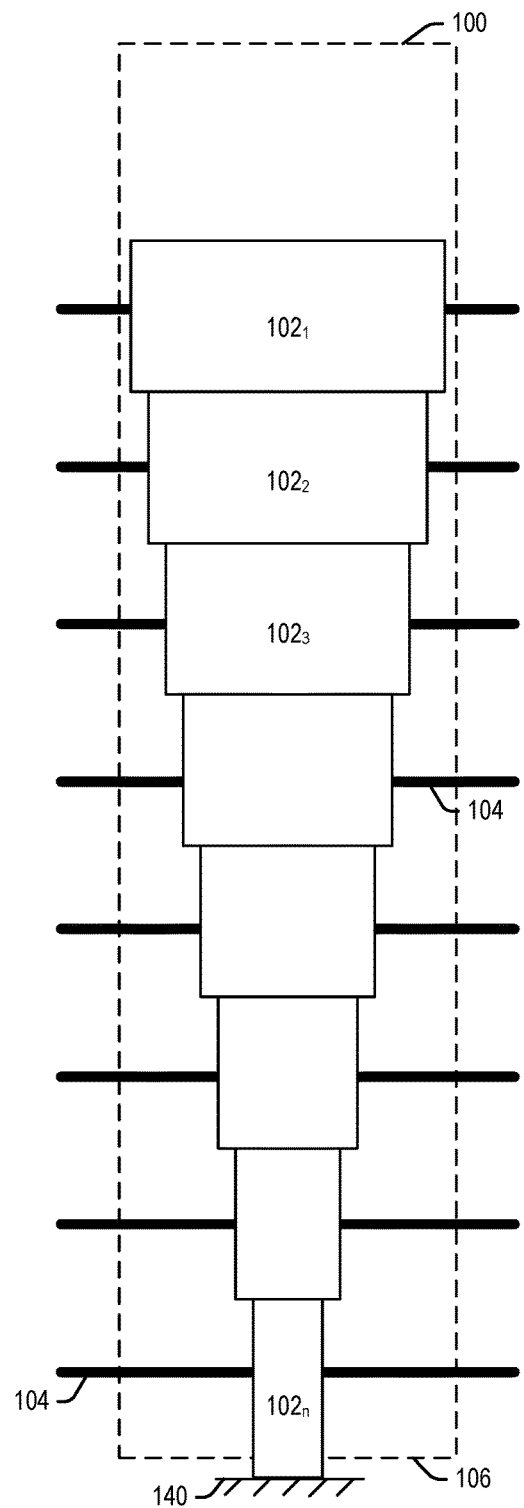

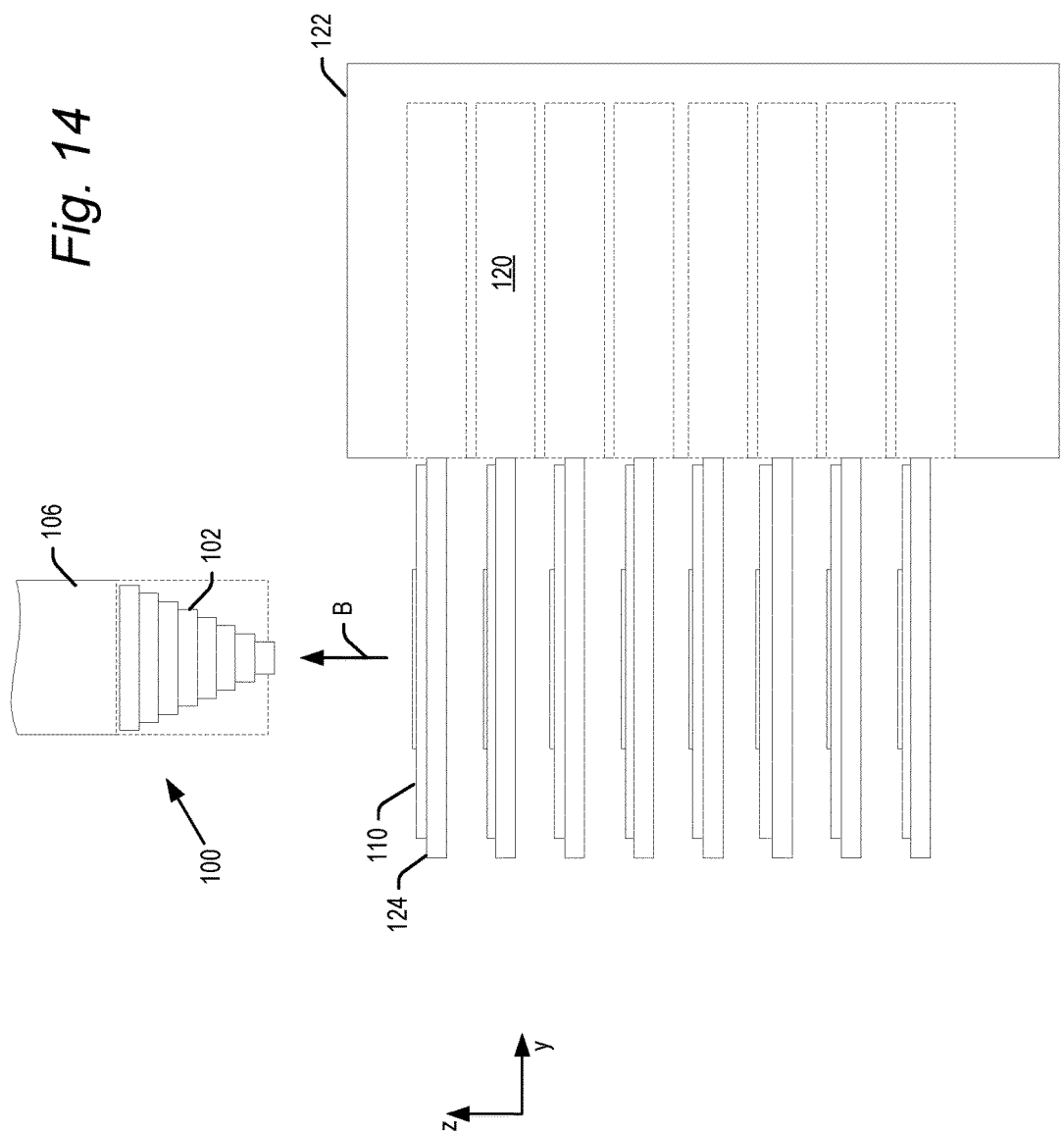

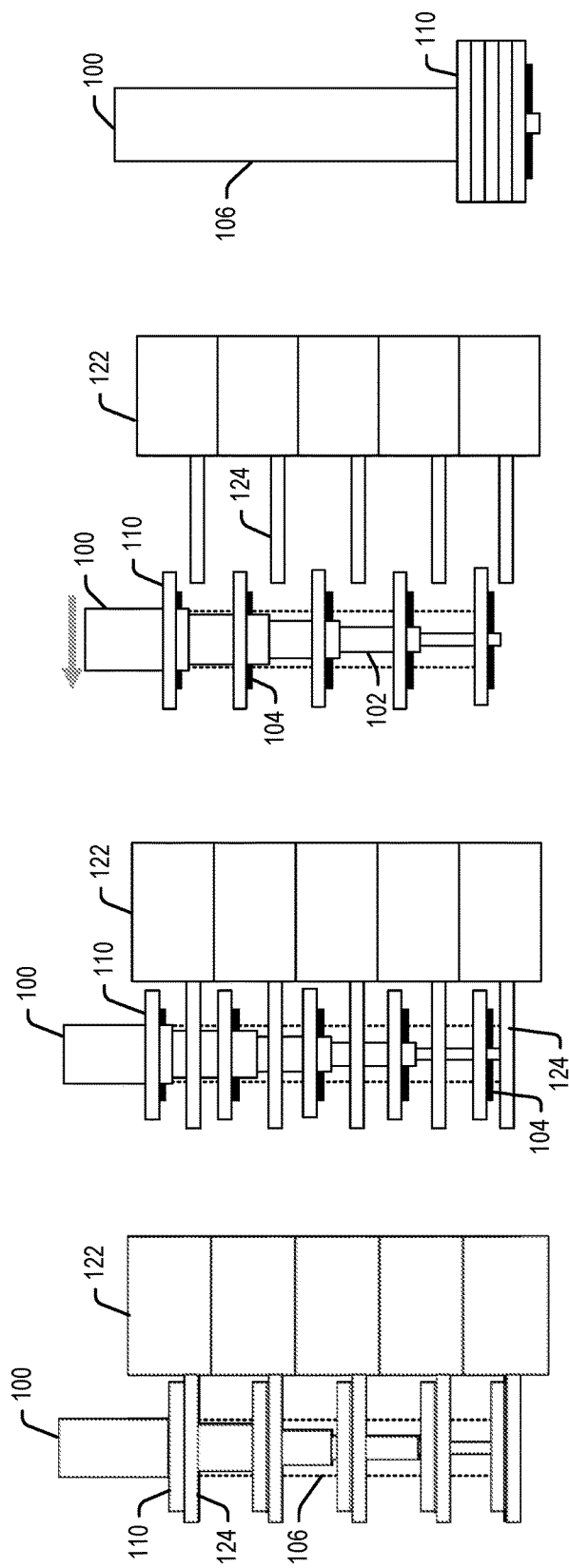

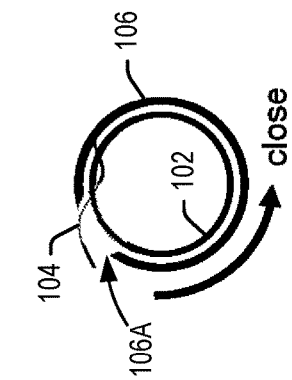
Fig. 19C
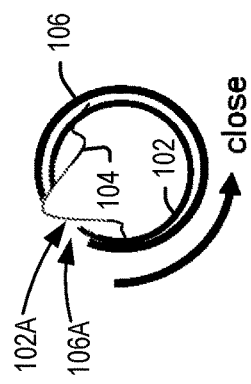
Fig. 20C
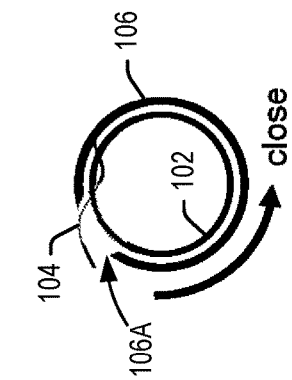
Fig. 19B
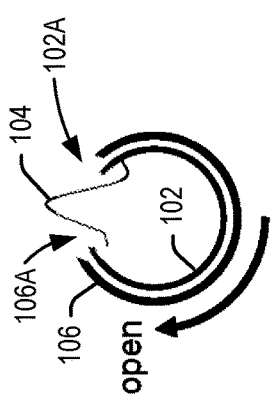
Fig. 20B
Fig. 19A
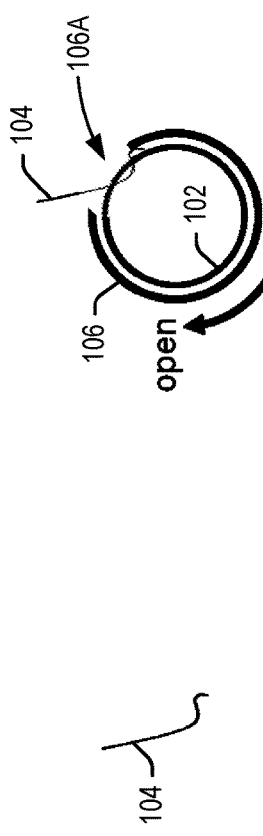
Fig. 20A

DEVICE FOR MULTIPLE DISC LOAD AND UNLOAD WITH A PLURALITY OF TELESCOPIC SECTIONS

BACKGROUND

Disc drives for use in reading from and/or writing to optical and magneto-optical discs are often stored vertically in a tower enclosure. FIGS. 1 and 2 show views of a conventional tower enclosure 10 including a plurality of disc drives 12 for reading data from and/or writing data to a plurality of discs. The discs 14 may be transferred from a cartridge 16 into respective disc drives 12 of the tower enclosure 10 one at a time. In particular, the robotic arm 20 may lift a disc 14 off of the cartridge 16, and transfer it to an open tray 22 of a disc drive 12. This individual disc transfer process may continue until all drives 12 in the tower enclosure 10 have been loaded.

In some tower enclosures, read/write operations do not begin until discs have been loaded into all drives as described above, thus resulting in wasted time as loaded drives remain idle during the disc-loading process. Similarly, upon completion of read/write operations, the robotic arm 20 may return the discs 14 from the disc drives 12 to the cartridge 16 one of the time, again resulting in wasted time.

SUMMARY

In one example, the present technology relates to a data disc transfer apparatus for mass transfer of a plurality of data discs to trays of a plurality of stacked devices, comprising: a pin support structure configured to extend through center holes of the plurality of data discs; and a plurality of pins mounted at positions along a length of the pin support structure, the plurality of pins configured to move between extended positions where the plurality of pins support the data discs spaced from each other for transfer to the trays, and retracted positions where the plurality of pins are withdrawn from supporting the data discs to enable mass transfer of the data discs from the pins to the plurality of trays.

In another example, the present technology relates to a data disc transfer apparatus for mass transfer of a plurality of data discs to trays of a plurality of stacked devices, comprising: a pin support structure configured to extend through center holes of the plurality of data discs; a cylindrical sheath provided around the pin support structure, the sheath comprising one or more slots along a length of the cylindrical sheath; and a plurality of pins mounted at positions along a length of the pin support structure, the plurality of pins configured to move between extended positions, extending through the one or more slots of the sheath, where the plurality of pins support the data discs, and retracted positions, restrained within the sheath, where the plurality of pins are withdrawn from supporting the data discs to enable mass transfer of the data discs from the pins to the plurality of trays.

In a further example, the present technology relates to a data disc transfer apparatus for mass transfer of a plurality of data discs to trays of a plurality of stacked devices, comprising: a plurality of telescopic sections capable of telescoping between extended positions and retracted positions with respect to each other; a plurality of pins, one or more pins of the plurality of pins mounted to each of the plurality of telescopic section, the pins configured to move between extended positions extending radially out from the telescopic sections, and retracted positions restrained radially closer to the telescopic sections; wherein the apparatus is configured to support the plurality of data discs in a stored position on the apparatus with the telescopic sections in their retracted positions and the plurality of pins in their retracted positions; and wherein the apparatus is configured to transfer the plurality of data discs to the trays of the stacked devices with the telescopic sections in their extended positions and the plurality of pins in their extended positions.

In a further example, the present technology relates to a method of mass transfer of a plurality of data discs from an apparatus to trays of a plurality of stacked devices, the method comprising: supporting the data discs on the apparatus with a first spacing relative to each other, the first spacing matching a spacing between the trays of the plurality of stacked devices; moving the apparatus supporting the data discs with the first spacing in a first direction toward the trays until the data discs are positioned over the trays; moving the apparatus in a second direction orthogonal to the first direction until the data discs are supported on the trays; retracting supports for supporting the data discs into the apparatus; and moving the apparatus with the supports retracted in a third direction, opposite the second direction, to separate the apparatus from the data discs supported on the trays.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

BRIEF DESCRIPTION OF THE DRAWINGS

FIG. 2 is an illustration of a conventional system for transferring data discs one at a time to stacked drives in a tower enclosure.

FIG. 3 is a front view showing a data disc storage and transfer apparatus including telescopic sections in retracted positions.

FIG. 4 is a front view showing a data disc storage and transfer apparatus including telescopic sections in extended positions.

FIGS. 13 and 14 are perspective and side views, respectively, showing a final step in the mass transfer of data discs from the storage apparatus to trays of stacked disc drives.

FIGS. 15-18 are side views showing steps for mass transfer of data discs from trays of stacked disc drives to the storage and transfer apparatus of the present technology.

FIGS. 19A-19C are top views of a disk support pin and its operation within the storage and transfer apparatus of the present technology.

FIGS. 20A-20C are top views of a disk support pin and its operation within the storage and transfer apparatus of the present technology.

DETAILED DESCRIPTION

Figure 1:
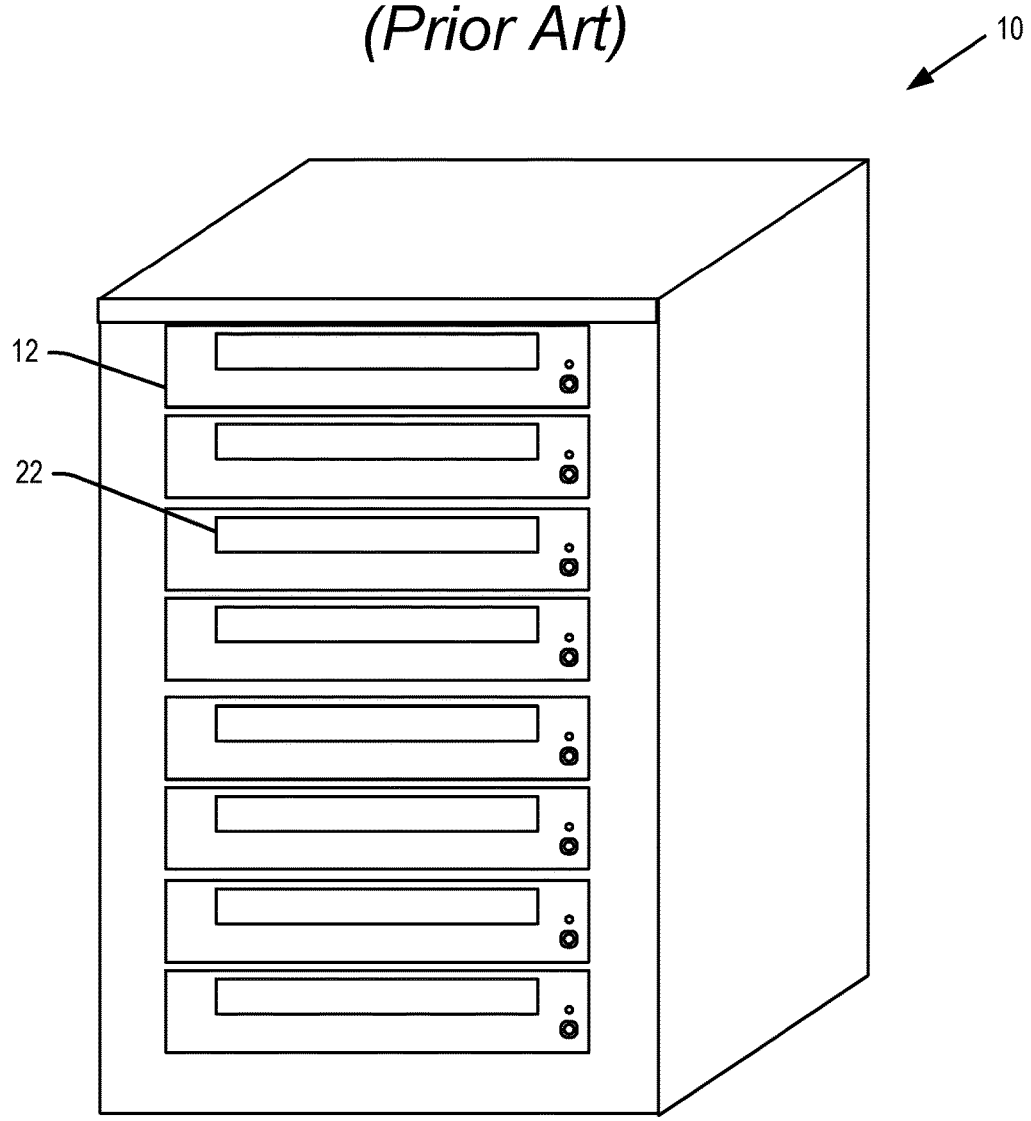
FIG. 1 is a perspective view of a conventional tower enclosure including a number of stacked disc drives.

The present technology, roughly described, relates to a disc storage and transfer apparatus for mass transfer of discs to and from all of the disc drives in a tower enclosure. The storage and transfer apparatus (also referred to herein as simply a transfer apparatus) may comprise a plurality of telescopic sections, each section comprising one or more retractable disc holding pins. The transfer apparatus may store a plurality of discs with the disc hold pins retracted and the telescopic sections collapsed over each other. In such a configuration, the stored discs may lie in contact with each other.

In order to transfer discs from the transfer apparatus, the pins may be deployed beneath each of the stored discs, and the telescopic sections may be extend relative to each other to space the discs from each other. The transfer apparatus may then move the discs over the trays of the disc drives in the tower. When used with a transfer apparatus of the present technology, all the trays may be extended from the disc drives, and each tray may have a slotted front opening. The telescopic sections of the transfer apparatus may move into the slotted front opening of the trays so that each of the discs in the respective sections may be vertically aligned in position over a tray to which it is to be transferred. Thereafter, the transfer apparatus may lower as a whole to seat the discs within the trays of respective drives. The disc holding pins may then be retracted and the telescopic sections may move vertically away from the discs, leaving them in the trays.

Upon completion of data access to or from the discs, the above-described operations of the disc storage and transfer apparatus may be run in reverse order to remove all of the discs from the trays of the tower enclosure. Thereafter, the sections may telescope over each other, and the disc holding pins may retract to again leave the discs in a stored position on the apparatus.

The terms "top" and "bottom," "upper" and "lower" and "vertical" and "horizontal," and forms thereof, as may be used herein are by way of example and illustrative purposes only, and are not meant to limit the description of the invention inasmuch as the referenced item can be exchanged in position and orientation. Also, as used herein, the terms "substantially" and/or "about" mean that the specified dimension or parameter may be varied within an acceptable manufacturing tolerance for a given application. In one embodiment, the acceptable manufacturing tolerance is ±.25%.

FIGS. 3 and 4 each show a front view of a disc storage and transfer apparatus 100, with the transfer apparatus 100 shown in an axially retracted position in FIG. 3, and in an axially extended position in FIG. 4. The disc storage and transfer apparatus 100 may comprise a pin support structure, which in embodiments comprise a plurality of cylindrical telescopic sections $102_1$, $102_2$, $102_3$, ..., $102_n$ (collectively, telescopic sections 102) housed within a sheath 106. The number of telescopic sections 102 shown in the figures is by way of example only. In embodiments, the number of telescopic sections may be the same as a number of disc drives in a tower enclosure (explain below) with which the transfer apparatus 100 operates. The number of telescopic sections need not be the same as a number of disc drives in such a tower enclosure in further embodiments.

Additionally, the size difference in the diameter of each of the telescopic sections 102 is shown for illustrative purposes. The telescopic sections may be made of a thin gauge plastic or metal such as sheet steel or aluminum, having a wall thickness of for example $\frac{1}{16}$ or $\frac{1}{32}$ of an inch. The wall thickness of the sections 102 may be larger or smaller than this in further embodiments. Each successive telescopic section 102 may be sized to fit snugly within the next adjacent telescopic section, while allowing the respective telescopic sections to move freely between the retracted and extended positions of FIGS. 3 and 4. Thus, a large number of telescopic sections may be provided without a large increase in diameter from the smallest telescopic section $102_n$ to the largest telescopic section $102_1$.

Each of the telescopic sections 102 may include one or more disc holding pins 104 mounted to each telescopic section 102, and biased to extend radially outward from the telescopic sections 102. FIGS. 3 and 4 show a pair of disc holding pins 104 extending from each telescopic section 102. The disc holding pins 104 may move between the extended position shown in FIGS. 3 and 4, and a retracted position shown for example in FIGS. 25-26 as explained below.

The disc storage and transfer apparatus 100 may further include a cylindrical pin restraint sheath 106 (shown in dashed lines in FIGS. 3 and 4) having an axial length at least as long as all of the telescopic sections 102 when extended as shown in FIG. 4. The diameter of the sheath 106 around the telescopic sections 102 is provided so as to fit within the center hole of a data disc, as explained below. The telescopic sections 102 may be positioned within the sheath 106, and may extend and retract axially within the sheath 106. The disc holding pins 104 may retract into the sheath 106, and may extend radially out of the sheath, and may retract radially into the sheath. In particular, as explained below in greater detail respect to FIGS. 19A-26, the sheath 106 includes one or more slots extending an axial length of the sheath. The sheath is rotatable between first and second positions. In the first position, the one or more pins align with and extend through the slots to their extended positions. In the second position, the one or more pins engage the interior sidewalls of the sheath 106 so as to be retracted and restrained within the sheath 106. Pins 104 move between their extended and retracted positions upon rotation of the sheath between the first and second positions as explained in greater detail below.

Figure 5A:
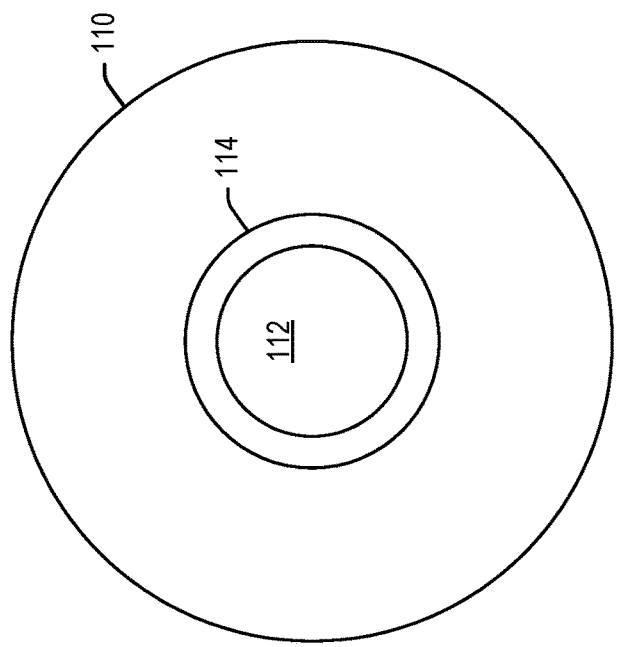
FIG. 5A is a top view of a conventional data disc.
Figure 5:
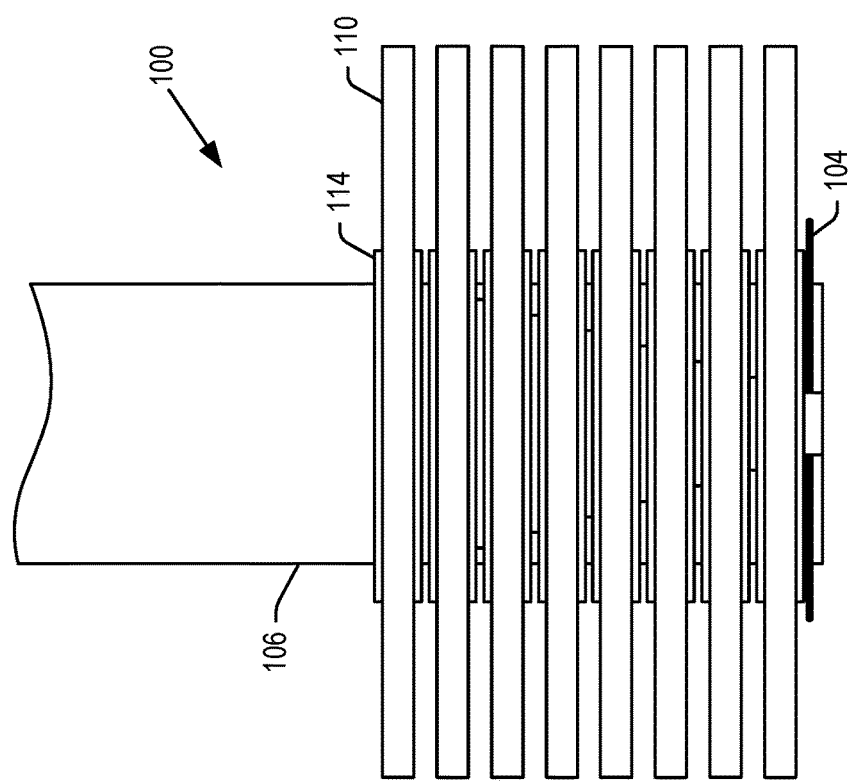
FIG. 5 is a front view showing a plurality of data discs stored on the storage and transfer apparatus according to embodiments of the present technology.

FIG. 5 shows the storage and transfer apparatus 100 with the telescopic sections 102 collapsed over each other in retracted positions (within sheath 106), and the pins 104 also within the sheath 106 in retracted positions. In this state, a number of data discs 110 may be stored on the transfer apparatus 100. Any of a variety of data discs 110 may be stored and transferred by the apparatus 100, including for example optical and magneto-optical storage discs such as CDs, DVDs and Blu-Ray discs. In the stored state shown in FIG. 5, the data discs 110 may rest against each other. FIG. 5A shows a top view of an example of a data disc 110 including a center hole 112 for supporting the data disc 110 on the sheath 106.

Some versions of data discs have hubs 114, around the central holes 112, which are slightly thicker than the data-carrying portions of data discs 110 around the hubs. As shown in FIG. 5, the hubs 114 of adjacent discs 110 rest against each other when the transfer apparatus 100 is in the storage state shown in FIG. 5. The hubs 114 create a slight spacing between the data-carrying portions of the discs 110. The disc holding pins 104 of the bottommost telescopic section $102_n$ may remain extended to support the stack of discs on the transfer apparatus 100 in the stored state.

Figure 6:
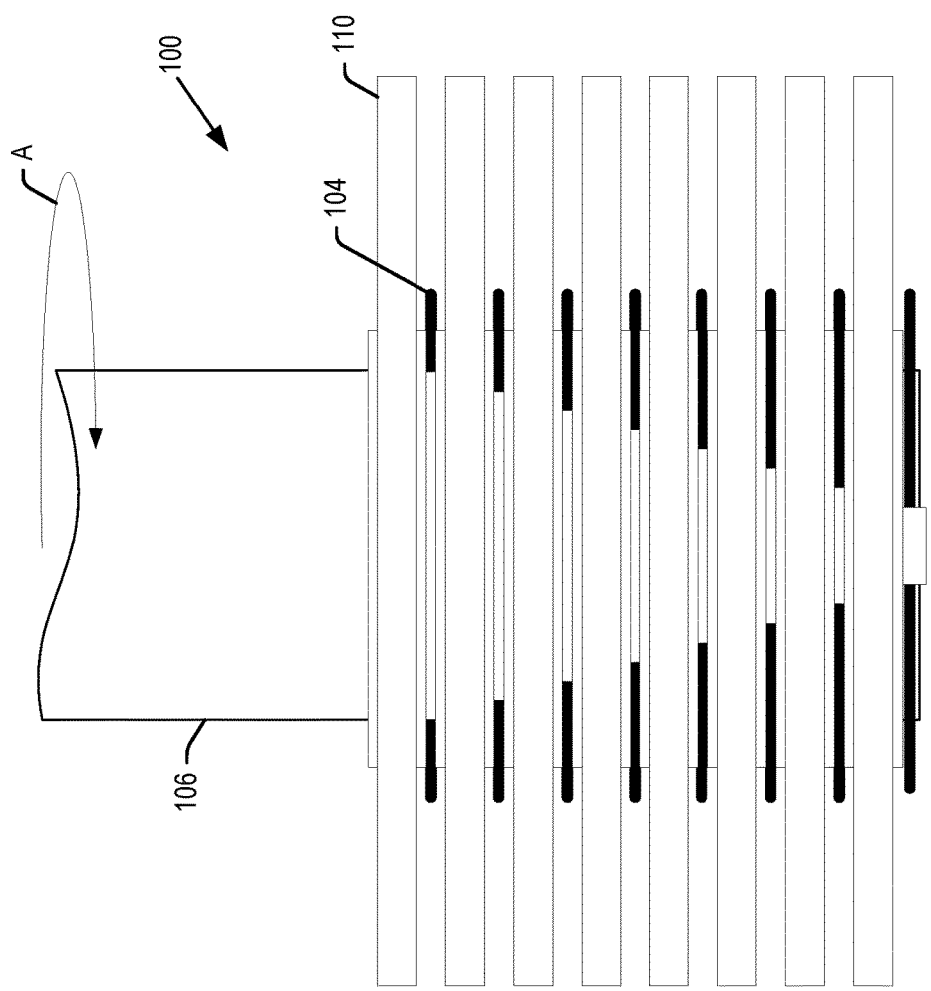
FIG. 6 is a front view showing a plurality of data discs stored on the storage and transfer apparatus with support pins extended between the data discs according to embodiments of the present technology.

Referring now to FIG. 6, in order to initiate the transfer of discs 110, the sheath 106 may be rotated as indicated by the arrow A, which frees the disc holding pins 104 to extend from the sheath to their extended positions between the discs as shown. The disc holding pins are mounted to the respective telescopic sections 102 so that, when the sections 102 are retracted in a collapsed position over each other (as shown for example in FIGS. 3 and 6), the disc holding pins are spaced with a pitch equal to the spacing between the stored discs, and positioned in the space between the stored discs. Thus, when the disc holding pins 104 extend, the pins extend beneath each of the stored discs 110 as shown in FIG. 6.

Figure 7:
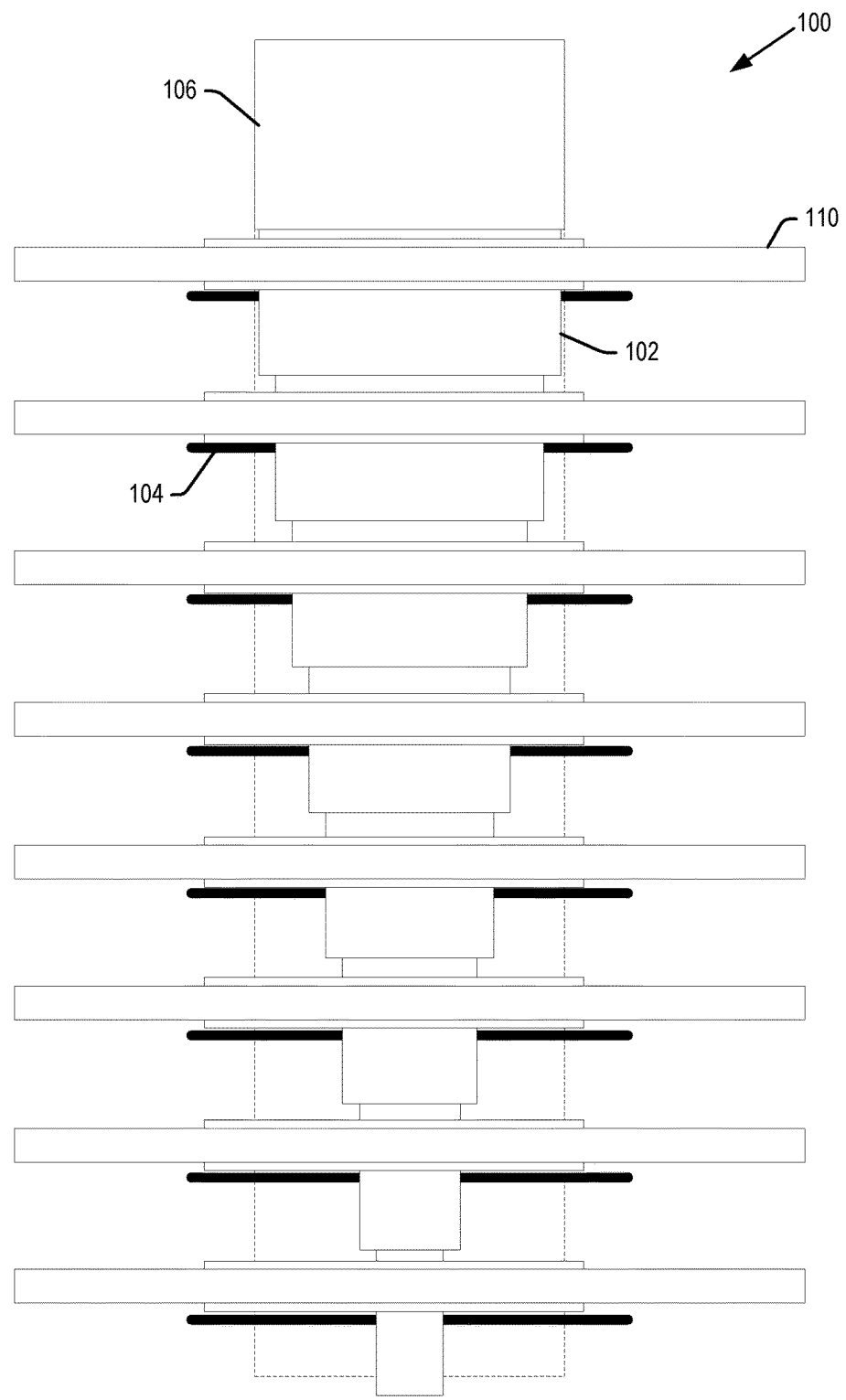
FIG. 7 is a is a front view showing a plurality of data discs on the storage and transfer apparatus with support pins extended between the data discs, and the telescopic sections extended with respect to each other, according to embodiments of the present technology.

With the discs 110 supported on the disc holding pins 104, the telescopic sections 102 may move to their extended positions, shown for example in FIGS. 4 and 7. In FIG. 7, a top portion of the sheath 106 is shown, but the remaining portion of the sheath 106 which extends the length of all of the telescopic sections 102 is shown in dashed lines for ease of understanding of the present technology. The lower portion of the sheath 106 is similarly shown in dashed lines in FIGS. 9 and 11-14, and omitted entirely from FIGS. 8 and 10. However, the telescopic sections 102 may be housed within the sheath 106 at all times, whether extended or retracted.

In embodiments, the storage and transfer apparatus 100 may be a manually-operated device. In such embodiments, the transfer apparatus 100 may be manually moved from its retracted position shown in FIG. 6 to the extended position shown in FIG. 7. For example, the uppermost telescopic section 1021 may be affixed to a wire or cable extending out of a top of the sheath. When the cable is slack, gravity may compress the telescopic sections over each other to their retracted positions. When the cable is pulled, the telescopic sections may extend relative to each other within the sheath 106. In further embodiments, the storage and transfer apparatus 100 may be electronically controlled by a controller (not shown). The controller may send a signal to an actuator (not shown) affixed to the wire or cable so as to leave the cable slack, or to pull the cable upwards relative to the sheath 106 to extend the telescopic sections relative to each other. The telescopic sections 102 may be made to move between their compressed, retracted positions and extended positions within sheath 106 by a variety of other mechanical means in further embodiments.

Figure 8:
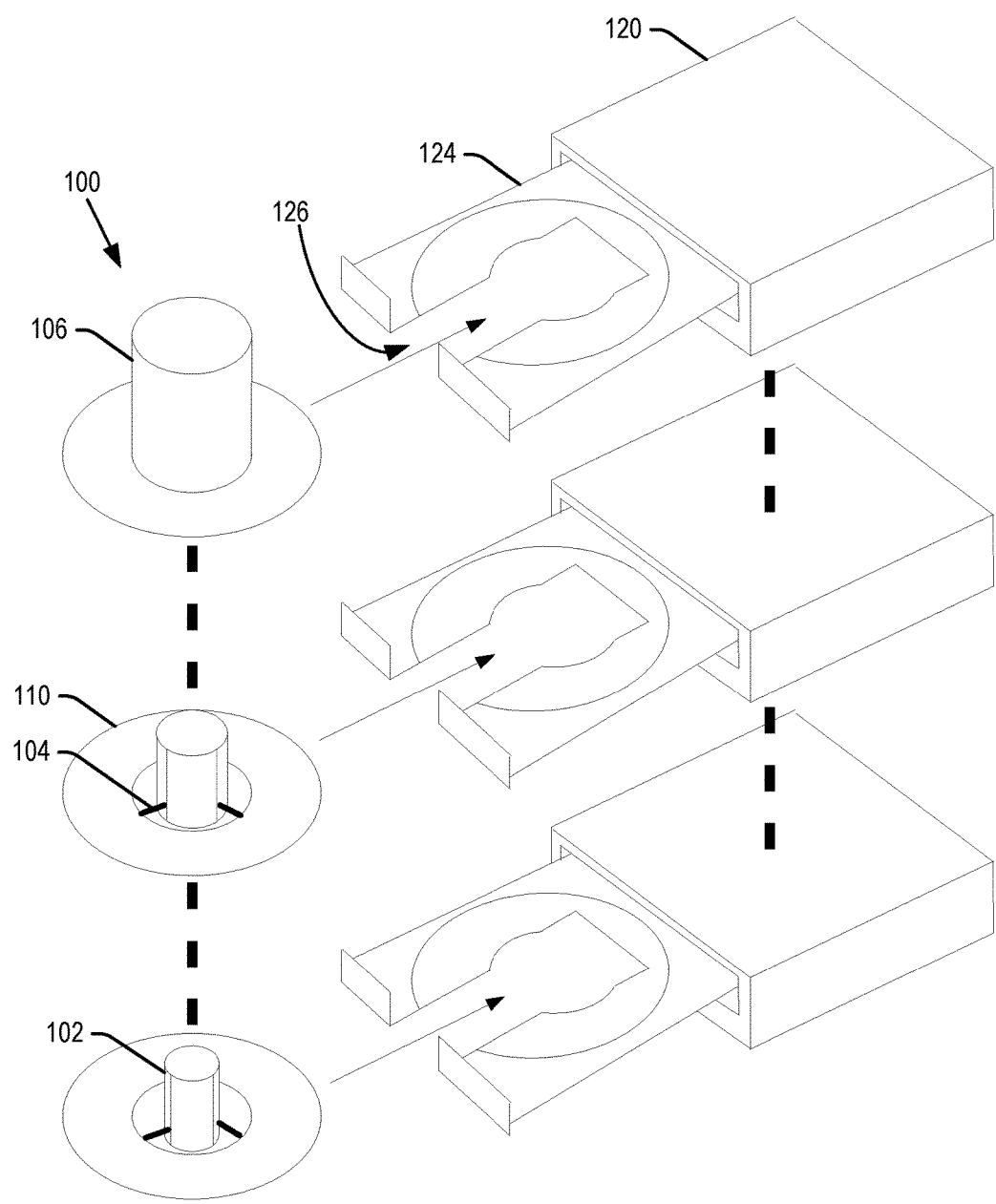
FIGS. 8 and 9 are perspective and side views, respectively, showing a first step in the mass transfer of data discs from the storage apparatus to trays of stacked disc drives.
Figure 9:
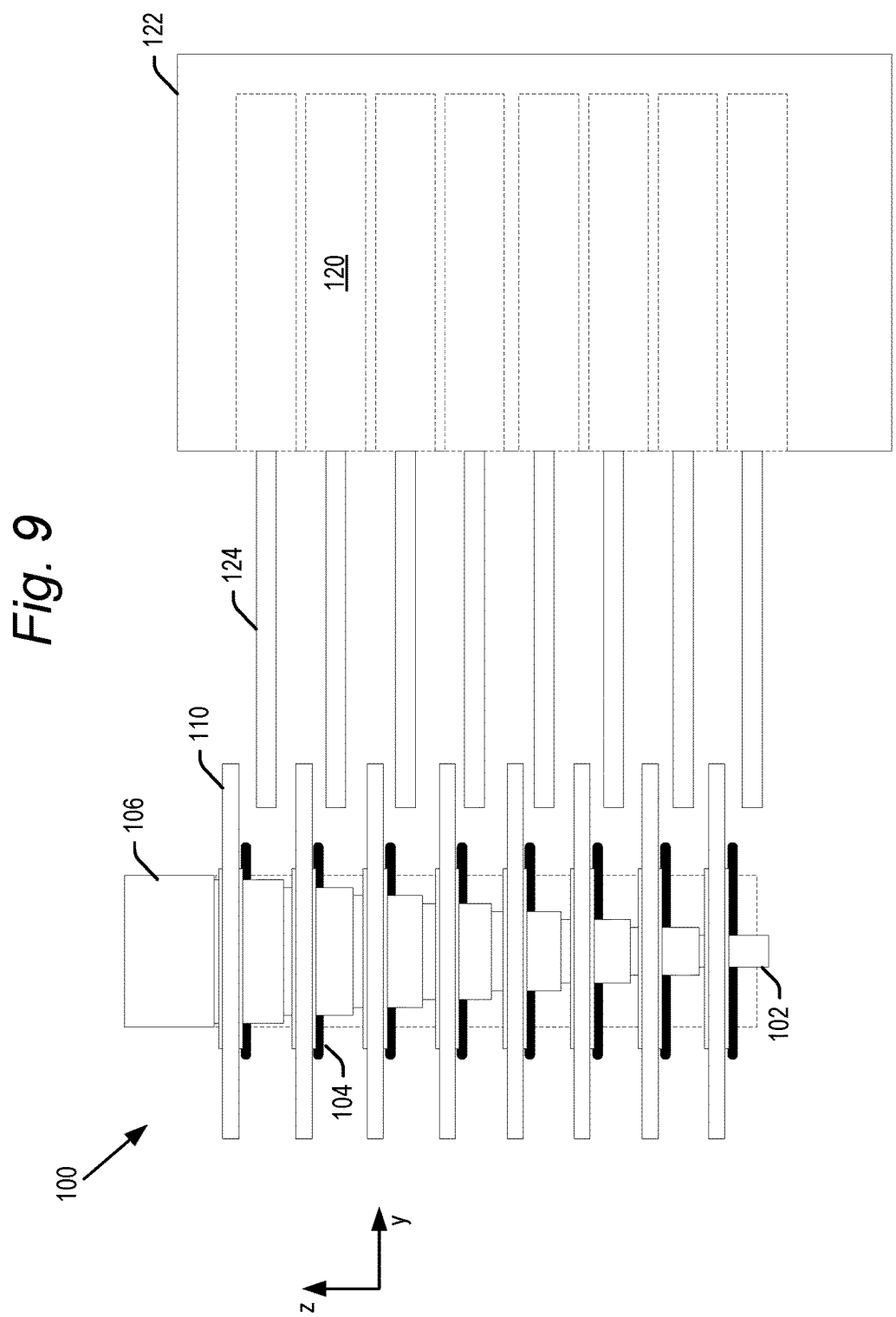

After the telescopic sections have been extended, the storage and transfer apparatus 100 may position the discs 110 for mass transfer of the discs into a column of stacked disc drives as shown in FIGS. 8 and 9. FIG. 8 is an exploded perspective view showing some discs 110 of the transfer apparatus 100 adjacent to some of the vertically stacked disc drives 120 in a tower enclosure of disc drives. FIG. 9 is a side view of the transfer apparatus 100 adjacent the vertical column of disc drives 120 in the tower enclosure 122. The trays 124 of each disc drive 120 may be extended to receive the discs 110 from the storage and transfer apparatus 100. In embodiments, the trays which receive the discs 110 from the transfer apparatus 100 are trays of disc drives 120. However, it is conceivable that the trays which receive the discs are associated with devices other than disc drives, such as for example disc storage devices, disc testing devices, disc cleaning devices, etc. Additionally, in order to receive the transfer apparatus 100, each of the trays 124 may include a slotted or open front portion 126 into which the transfer apparatus 100 passes to load the discs 110 onto the trays 124.

In manually-operated embodiments, the storage and transfer apparatus 100 may be carried to the disc drives 120 and manually positioned. In electronically controlled embodiments, the storage and transfer apparatus 100 may be supported on a robotic arm (not shown) capable of translating the transfer apparatus 100 in an y-z plane, as indicated by the orthogonal axes in FIG. 9. The robotic arm may also be capable of translation in a third, orthogonal (x) direction, parallel to the front face of the tower enclosure 122.

Figure 10:
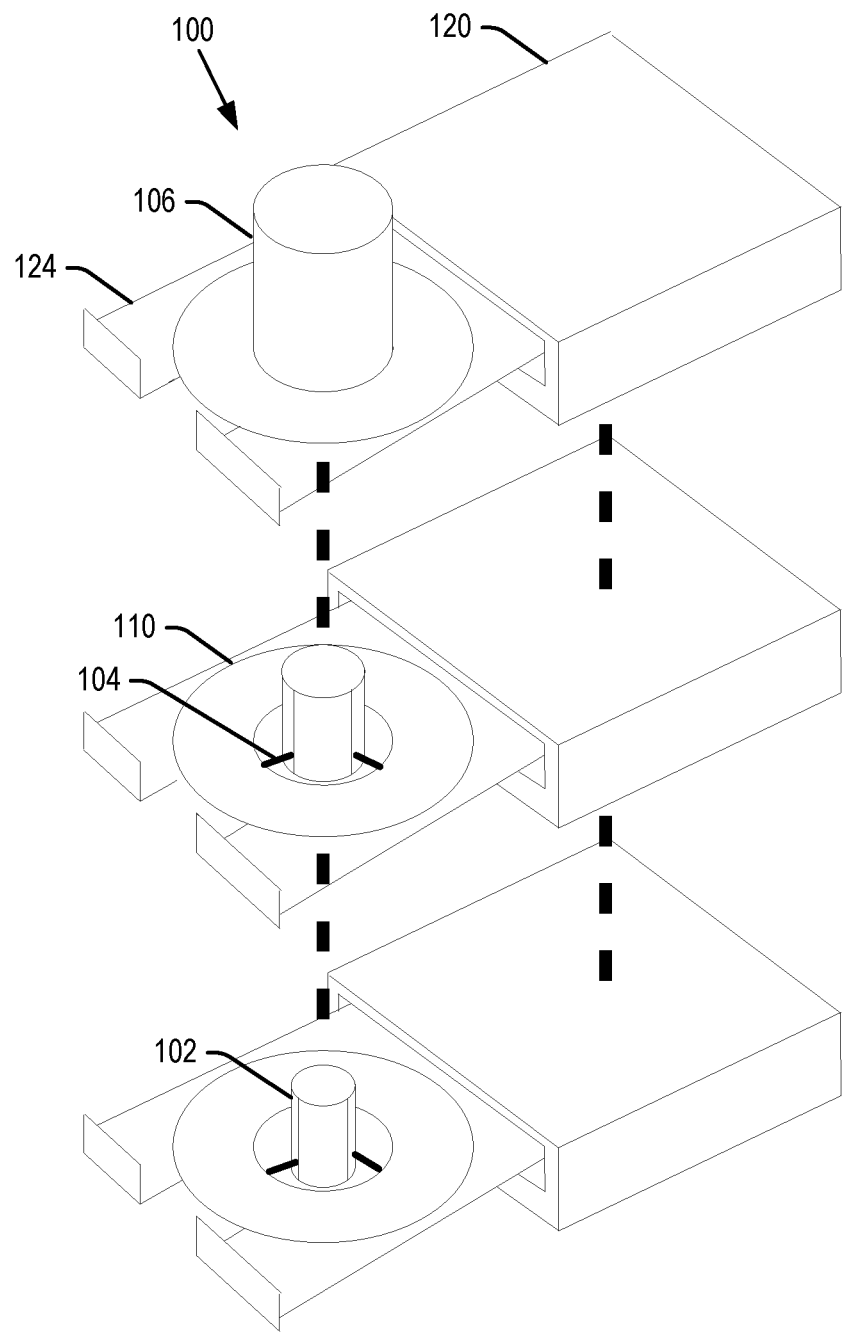
FIGS. 10 and 11 are perspective and side views, respectively, showing a second step in the mass transfer of data discs from the storage apparatus to trays of stacked disc drives.
Figure 11:
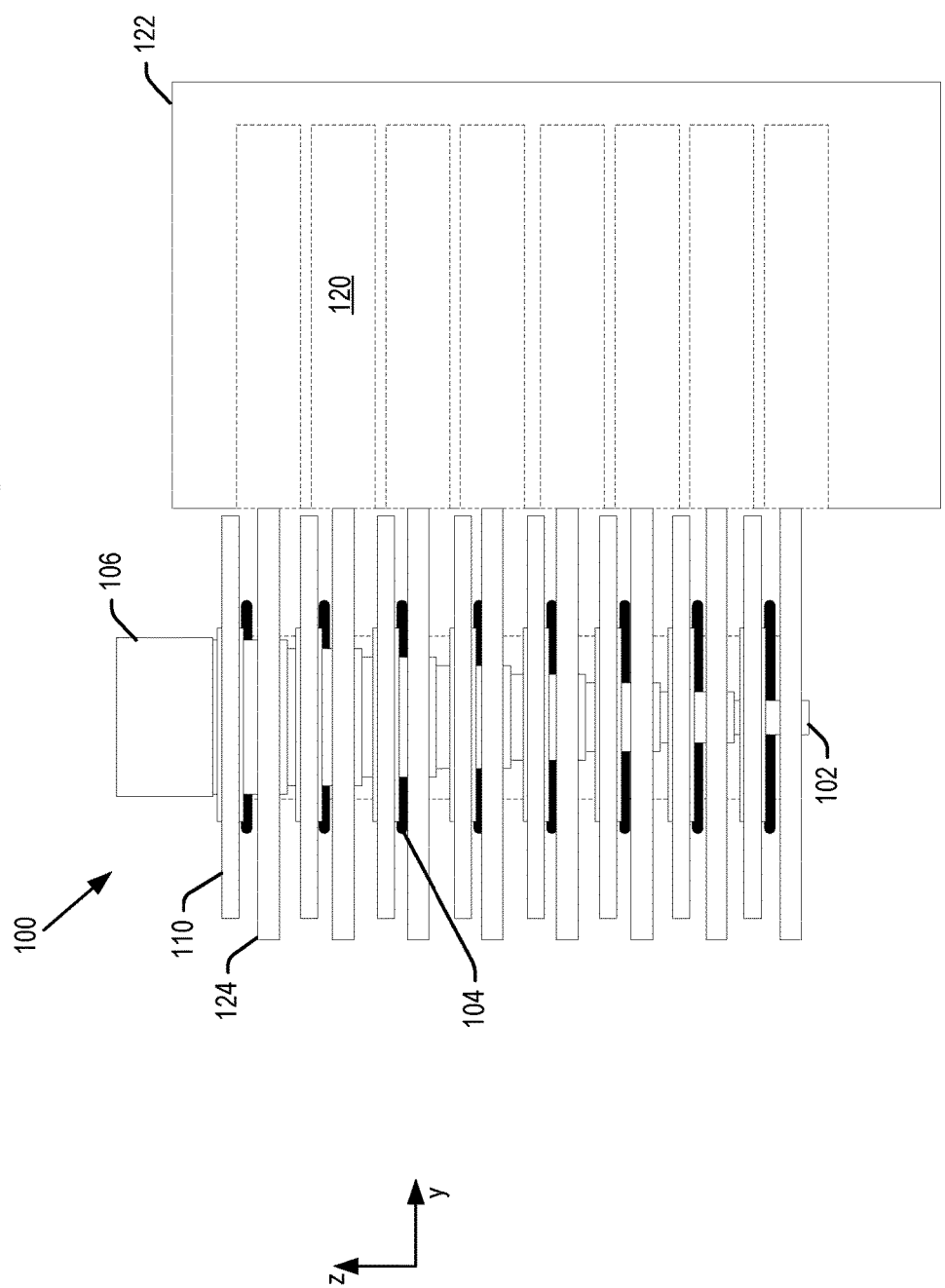
Figure 12:
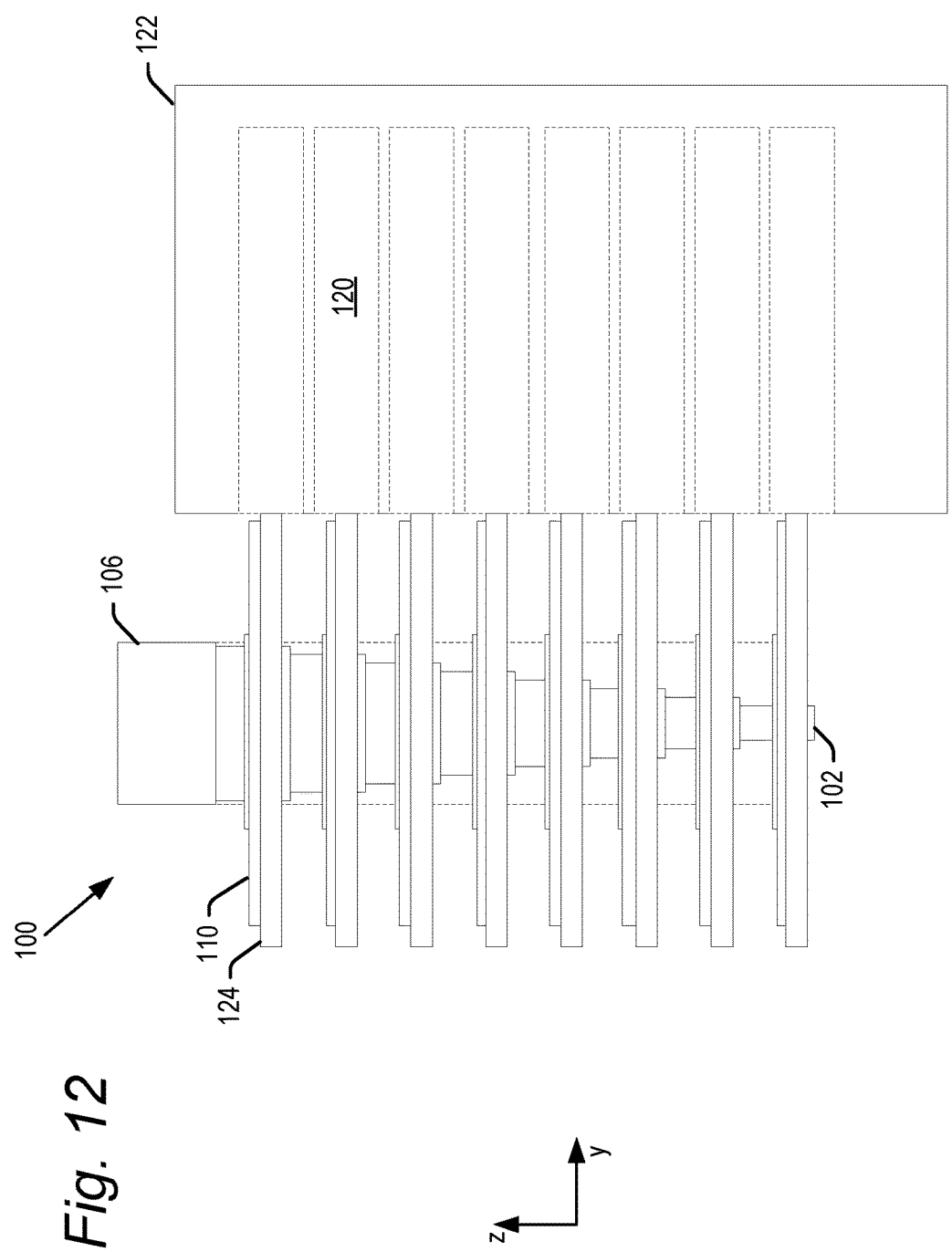
FIG. 12 is a side view showing a third step in the mass transfer of data discs from the storage apparatus to trays of stacked disc drives.

The perspective and side views of FIGS. 10 and 11 are similar to the views of FIGS. 8 and 9, respectively, but further show the storage and transfer apparatus 100 having moved in the y-direction through the slotted front portions 126, and down along the z-direction to properly position each of the discs 110 over their respective trays 124. The axial lengths of each of the telescopic sections 102 are provided so that, the discs supported on the pins 104 of each telescopic section 102 are spaced from each other at least approximately same pitch as between the trays 124 of the disc drives 120 in the tower enclosure 122. Thereafter, as shown in the side view of FIG. 12, the sheath 106 may be rotated to retract the disc holding pins 104, to thus release each of the discs 110 onto their respective trays in a mass transfer of the discs 110.

Figure 13:
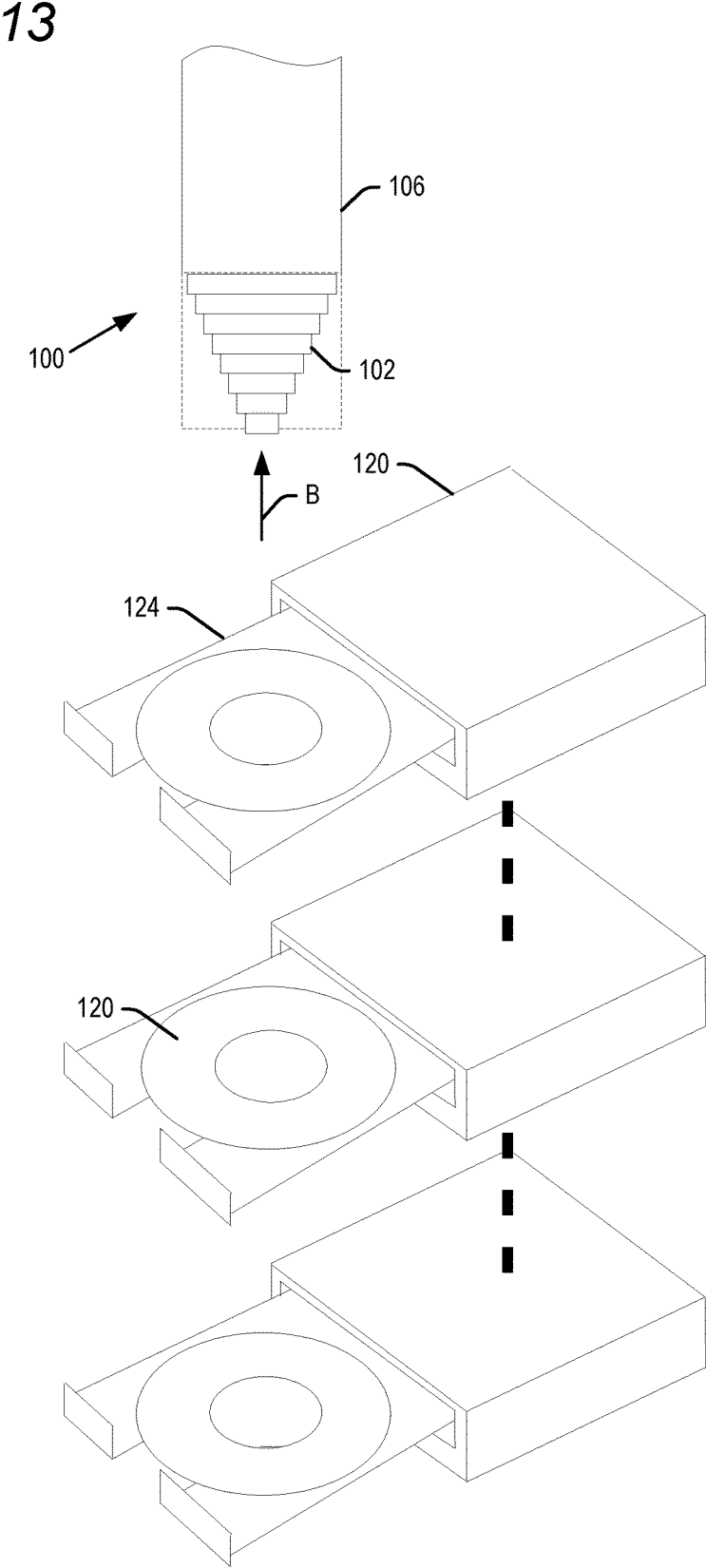
Figure 22:
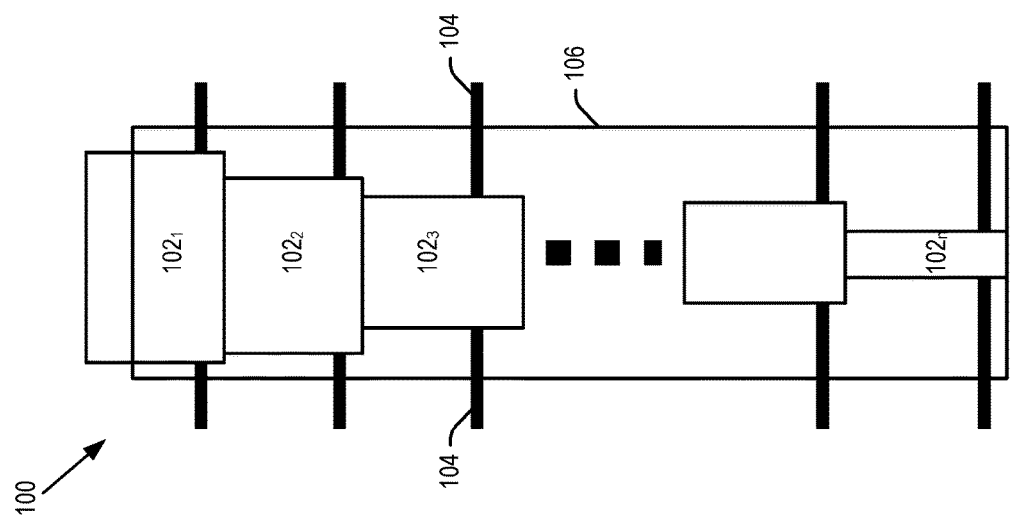
FIGS. 21-26 show further embodiments of a disc support pin and how the sheath may be used to move the disc support pin between its retracted and extended positions.
Figure 21:
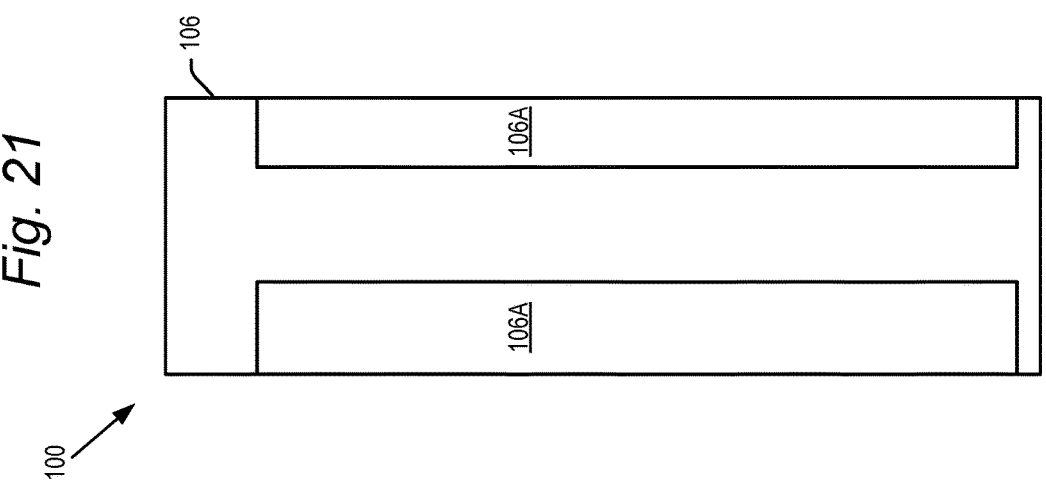

Next, as shown in FIGS. 13 and 14, with the disc holding pins 104 retracted, the sheath 106 may be moved vertically in the direction of arrow B along the z-axis, removing the storage and transfer mechanism from the trays 124 and leaving the discs 110 in the trays. The trays may then close and data transfer may be performed on the discs 110 within the disc drives 120. In FIGS. 13 and 14, the telescopic sections 102 move to their retracted positions as the sheath 106 moves vertically up away from the trays 124. However, as explained below, the telescopic sections may remain in their extended positions as the sheath 106 moves vertically away from the trays.

As shown in the side views of FIGS. 15-18, the above-described process may be reversed to remove the discs from the discs drives all at once. Again, a portion of the sheath 106 is shown in dashed lines in FIGS. 15-17 for clarity. Referring initially to FIG. 15, after data transfer two from all discs 110 in the tower enclosure 122 is completed, the trays 124 are opened. Thereafter, the storage and transfer apparatus 100 is inserted down to the center of each of the discs 110 in the trays 124, with the telescopic sections 102 extended relative to each other. The transfer apparatus is lowered until the disc holding pins 104 are positioned just beneath each of the discs. Thereafter, the pins 104 may be extended by rotating the sheath 106 to support each of the discs 110 in the tower enclosure 122 on the disc holding pins 104. The transfer apparatus may then move upward along the z-axis to lift each of the discs 110 clear of their respective trays 124 as shown in FIG. 16.

The storage and transfer apparatus 100 may then move horizontally along the y-axis out through the slotted front portions 126 of the trays 124 as shown in FIG. 17 until the discs 110 are clear of the trays 124. Thereafter, the telescopic sections 102 may retract over each other and the disc holding pins 104 may retract into the sheath 106 so that the discs 110 are once again stacked against each other in a stored position as shown in FIG. 18.

Further details of embodiments of the disc holding pins 104 and their operation with respect to sheath 106 will now be explained in greater detail respect to FIGS. 19A-26. FIG. 19A shows an example of a shape of a disc holding pin 104, and FIGS. 19B and 19C show the operation of the disc holding pin 104 of FIG. 19A, through a horizontal cross-section of the transfer apparatus 100. Disc holding pins 104 may be mounted to respective telescopic sections 102 so that, in an unbiased position, the pins stick out of an axial slot 106A provided along the length of sheath 106 when the pins 104 align with the slot 106A (FIG. 19B). The pins 104 may be flexible so that rotation of the sheath 106, for example counterclockwise as shown in FIG. 19C, causes the pin 104 to retract and get trapped in a space between the sheath 106 and the telescopic section 102. The pin may move between an extended position (FIG. 19B) and a retracted position (FIG. 19C) upon clockwise rotation of the sheath 106 in further embodiments.

FIGS. 20A-20C show the operation of a disc holding pin 104 having a different configuration than that shown in FIGS. 19A-19C. In general, the embodiment of FIGS. 20A-20C may be similar to that described above. However, in this embodiment, the telescopic section 102 may also have a slot 102A. When the sheath 106 rotates to move the pin 104 from an extended position (FIG. 20B) to a retracted position (FIG. 20C), the pin 104 may retract through the slot 102A, into an interior of the telescopic section 102. While FIGS. 19A-20C show a single disc holding pin 104 around the circumference of the telescopic section 102, the telescopic section 102 may have more than one disc holding pin 104 operating as in the above-described embodiments.

Where the slots 106A extend straight up and down the sheath 106, the mass transfer of the discs 110 to the trays 124 would be simultaneous. However, it is conceivable that the slots 106A be provided in a helical arrangement axially down the sheath 106. In such an embodiment, the mass transfer of disks 110 to the trays 124 may not be simultaneous but would be sequential.

In order for the pins to radially retract and extend from the one or more slots 106A upon rotation of the sheath 106, the telescoping sections need to remain stationary and not rotate as the sheath rotates. This may be accomplished a variety of ways. In one example, the uppermost telescopic section $102_1$ may extend out above the sheath 106 (as shown for example in FIGS. 23 and 25) and be anchored so as to remain stationary as the sheath 106 is rotated. In a further example, the lowermost telescopic section $102_n$ may extend from the sheath 106 and be anchored to a surface 140, as shown in FIGS. 3 and 4. The surface 140 may mounted to, and move with, portions of the transfer apparatus 100, but may be separate from the sheath 106. Other means of preventing relative rotation between the telescopic sections 102 and the sheath 106 are contemplated. Additionally, while each telescopic section is able to telescope axially with respect to the adjacent telescopic sections, the telescopic sections may be mounted to each other so as to prevent rotation between adjacent telescopic sections 102.

Figure 24:
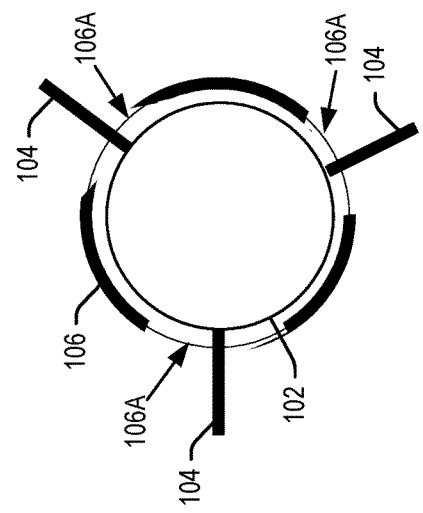
Figure 23:
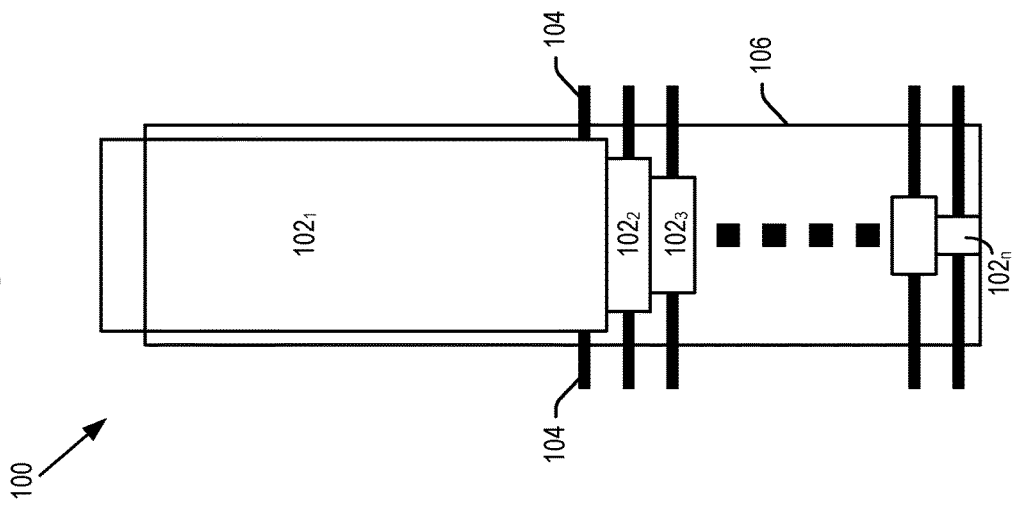
Figure 26:
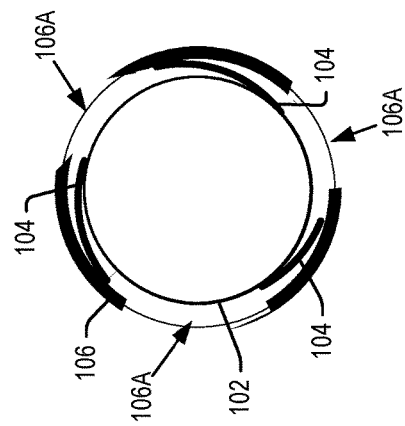
Figure 25:
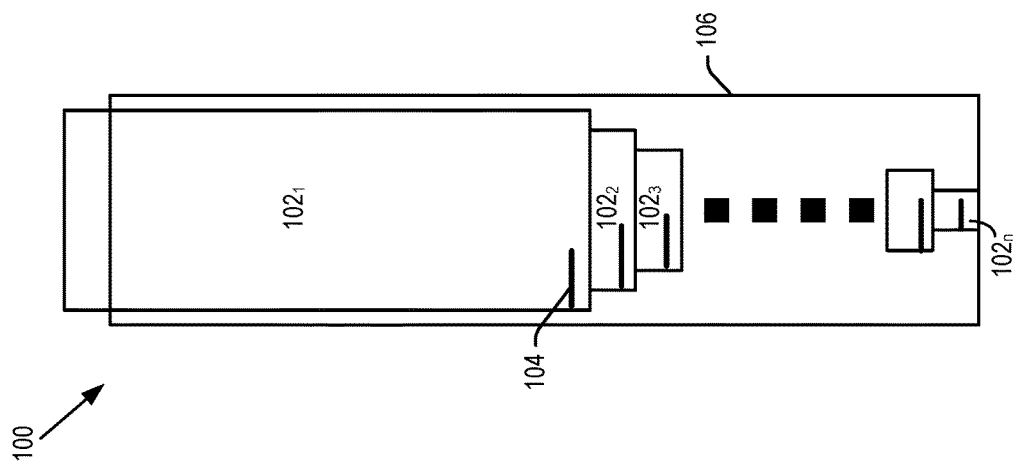

FIGS. 23-26 show a further embodiment including three disc holding pins 104 around a circumference of the telescopic section 102. FIGS. 23 and 24 show the slots 106A of sheath 106 aligned with the disc holding pins 104 so that the pins 104 are in their extended positions through slots 106A. FIGS. 25 and 26 show the sheath rotated relative to the position of FIGS. 23 and 24, so that the disc holding pins 104 no longer align with the slots 106A. Rotation of the sheath 106 has bent the disc holding pins 104 so as to be trapped in a retracted position in a space between the sheath 106 and the telescopic section 102.

While a few examples of disc holding pins 104 have been set forth in FIGS. 19A-26, it is understood that the disc holding pins 104 may be provided in a wide ride of other configurations in further embodiments. Additionally, while rotation of the sheath has been described above as a mechanism for moving the disc holding pins 104 between their extended and retracted positions, it is understood that the pins 104 may be moved between their extended and retracted positions by other mechanical schemes in further embodiments. The one or more slots 106A in the sheath 106 may extend along the entire axial length of the sheath 106, and the above-described operation of the sheath 106 to move the disc holding pins 104 between the retracted and extended position may occur at each telescopic section 102.

In embodiments described above, the sheath 106 and telescopic sections 102 are cylindrical with concentric circular cross-sections (in a horizontal plane). However, it is conceivable that the telescopic sections 102 have cross-sectional shapes other than circular, provided that they fit within the sheath 106. For example, the telescopic sections 102 could have a square, rectangular or oval cross-sectional shape.

In embodiments described above, the storage and transfer apparatus 100 comprises disc holding pins 104 extending from a plurality of collapsible telescopic sections 102. Thus, when not in use transferring discs to and from disc drives 120, the telescopic sections 102 may collapse to a storage position shown for example in FIGS. 3 and 18. However, a further embodiment of the present technology may operate without telescoping sections 102. Such an embodiment will now be described with reference to FIG. 27.

Figure 27:
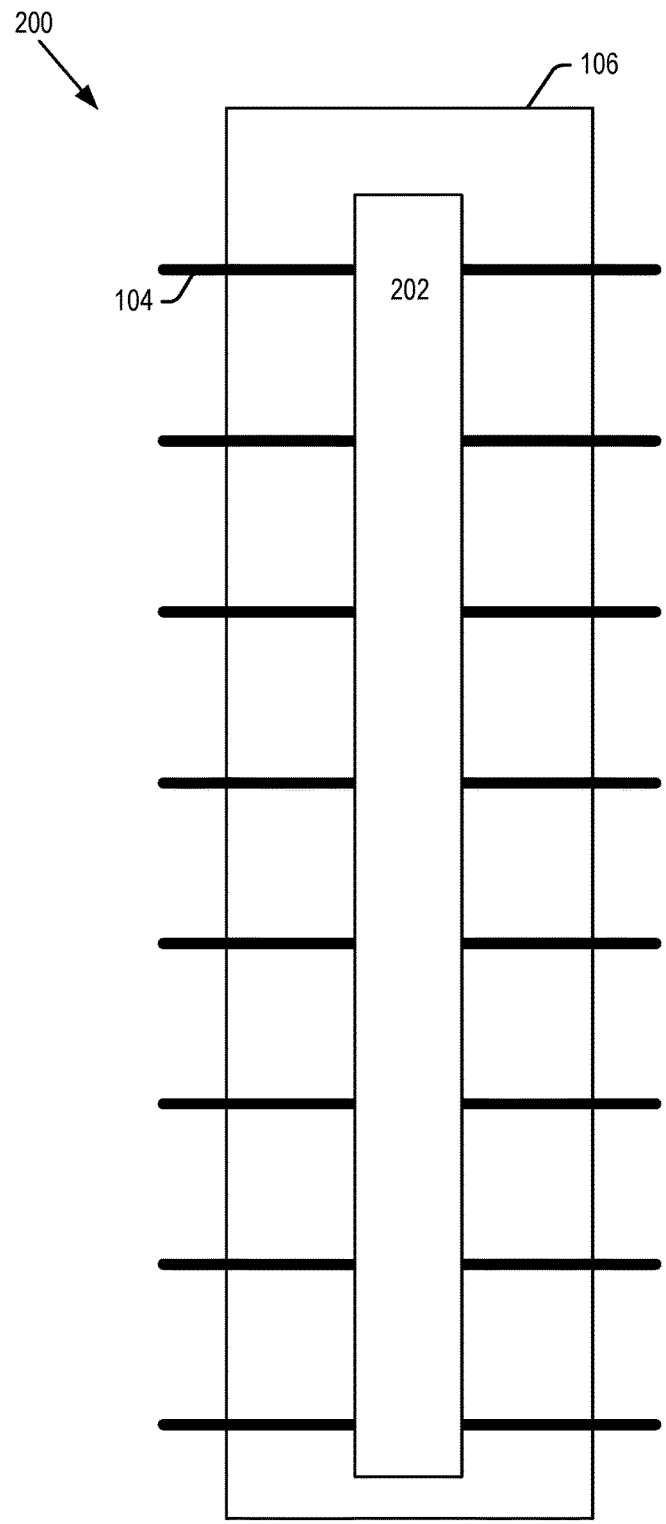
FIG. 27 is a front view of a storage and transfer apparatus according to an alternative embodiment of the present technology.

The embodiment of FIG. 27 shows a storage and transfer apparatus 200 including a sheath 106 and disc holding pins 104 which may have the same configuration and operation as described in any of the above embodiments. However, the transfer apparatus 200 of this embodiment may include a pin support structure comprising a solid cylinder 202 mounted within sheath 106, and constrained so as to remain stationary and not rotate as the sheath rotates as described above. In this embodiment, the disc holding pins 104 may be mounted along the axial length of the solid cylinder 202, extending radially as described above. The pins 104 may be spaced at positions along the axial length of the solid cylinder that match the spacing of the trays 124 of the disc drives 120 in the tower enclosure 122.

The storage and transfer apparatus 200 of FIG. 27 may store discs 110 when not in use. However, unlike the embodiment described above for example with respect to FIG. 3, the transfer apparatus 200 may store the discs 110 spaced from each other along the length, supported on the extended disc holding pins 104. The storage and transfer apparatus 200 may transfer discs to the trays 124 of disc drives 120 as described above with respect to FIGS. 8-12. Once transferred, the transfer apparatus may move vertically upward to leave the discs behind. The process may be reversed to again transfer the discs from the trays 124 back onto the disc holding pins 104. In this embodiment, the disc holding pins may remain extended at all times (for example during storage), and only retract when the discs 110 are seated on the trays 124 to allow vertical removal of the storage and transfer apparatus 100.

Instead of a solid cylinder 202, a variety of other pin support structures may be used in this embodiment, with the provision that they support the pins 104 at fixed positions along their length to extend radially outward so that they can extend through the one or more slots 106A in the sheath 106 in an extended position, and be constrained within the sheath in a retracted position.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A data disc transfer apparatus for mass transfer of a plurality of data discs to trays of a plurality of stacked devices, comprising:
   a pin support structure configured to extend through center holes of the plurality of data discs; and
   a plurality of pins mounted at positions along a length of the pin support structure, the plurality of pins configured to move between extended positions where the plurality of pins support the data discs spaced from each other for transfer to the trays, and retracted positions where the plurality of pins are withdrawn from supporting the data discs to enable mass transfer of the data discs from the pins to the plurality of trays;
   wherein the pin support structure comprises a plurality telescopic sections configured to move between retracted positions where the telescopic are collapsed over each other, and extended positions where the telescopic sections are extended relative to each other.

2. A data disc transfer apparatus as recited in claim 1, wherein one or more pins of the plurality of pins are mounted to each of the plurality of telescopic sections.

3. A data disc transfer apparatus as recited in claim 2, wherein the telescopic sections are cylindrical in shape.

4. A data disc transfer apparatus as recited in claim 2, wherein a pitch of the plurality of pins in the plurality of telescopic sections in the extended position matches a spacing between the stacked trays.

5. A data disc transfer apparatus as recited in claim 2, wherein a pitch of the plurality of pins in the plurality of telescopic sections in the retracted position matches a spacing between the data discs stacked on top of each other.

6. A data disk transfer apparatus of claim 1, further comprising a sheath around the pin support structure, the sheath configured to move the plurality of pins between the extended positions and retracted positions.

7. A data disk transfer apparatus of claim 6, the sheath comprising one or more slots, the sheath rotatable with respect to the pin support structure, rotation of the sheath to a first position enabling the pins to extend through the one or more slots to the extended positions, and rotation of the sheath to a second position trapping the pins in the retracted position within the sheath.

8. A data disk transfer apparatus of claim 6, the sheath comprising one or more slots, the sheath rotatable with respect to the pin support structure, rotation of the sheath to a first position enabling the pins to extend through the one or more slots to the extended positions, and rotation of the sheath to a second position trapping the pins in the retracted position within the sheath.

9. A data disk transfer apparatus of claim 8, wherein the one or more slots extend straight along an axis of the sheath for simultaneous movement of the pins to the retracted positions upon rotation of the sheath to the second position and a simultaneous mass transfer of the discs to the trays.

10. A data disc transfer apparatus for mass transfer of a plurality of data discs to trays of a plurality of stacked devices, comprising:
    a pin support structure configured to extend through center holes of the plurality of data discs;
    a cylindrical sheath provided around the pin support structure, the sheath comprising one or more slots along a length of the cylindrical sheath; and
    a plurality of pins mounted at positions along a length of the pin support structure, the plurality of pins configured to move between extended positions, extending through the one or more slots of the sheath, where the plurality of pins support the data discs, and retracted positions, restrained within the sheath, where the plurality of pins are withdrawn from supporting the data discs to enable mass transfer of the data discs from the pins to the plurality of trays;
    wherein the pin support structure comprises a plurality of telescopic sections configured to move between retracted positions where the telescopic sections are collapsed over each other, and extended positions where the telescopic sections are extended relative to each other.

11. The data disc transfer apparatus of claim 10, the sheath rotatable between a first position where the pins extend through the one or more slots of the sheath, and a second position where the pins are restrained within the sheath.

12. A data disc transfer apparatus as recited in claim 11, wherein one or more pins of the plurality of pins are mounted to each of the plurality of telescopic sections.

13. A data disc transfer apparatus as recited in claim 12, wherein the apparatus is configured to store the data discs on the sheath with the plurality of telescopic sections in the retracted positions with respect to each other, and the pins in the retracted positions.

14. A data disc transfer apparatus as recited in claim 12, wherein the apparatus is configured to transfer the data discs from the sheath with the plurality of telescopic sections in the extended positions with respect to each other, and the pins in the extended positions.

15. A data disc transfer apparatus for mass transfer of a plurality of data discs to trays of a plurality of stacked devices, comprising:
    a plurality of telescopic sections capable of telescoping between extended positions and retracted positions with respect to each other;

a plurality of pins, one or more pins of the plurality of pins mounted to each of the plurality of telescopic section, the pins configured to move between extended positions extending radially out from the telescopic sections, and retracted positions restrained radially closer to the telescopic sections;

wherein the apparatus is configured to support the plurality of data discs in a stored position on the apparatus with the telescopic sections in their retracted positions and the plurality of pins in their retracted positions; and wherein the apparatus is configured to transfer the plurality of data discs to the trays of the stacked devices with the telescopic sections in their extended positions and the plurality of pins in their extended positions;

wherein the plurality of pins are configured to extend through center holes of the plurality of data discs.

16. The data disc transfer apparatus of claim 15, further comprising a cylindrical sheath provided around the telescopic section, the sheath comprising one or more slots along a length of the cylindrical sheath, the sheath configured to move the plurality of pins between the extended positions and retracted positions.

17. A data disk transfer apparatus of claim 16, the sheath comprising one or more slots, the sheath rotatable with respect to the telescopic sections, rotation of the sheath to a first position enabling the pins to extend through the one or more slots to the extended positions, and rotation of the sheath to a second position trapping the pins in the retracted position within the sheath.

* * * * *